(12) United States Patent
Khan. P et al.

(10) Patent No.: US 11,019,392 B2
(45) Date of Patent: May 25, 2021

(54) METHODS AND APPARATUS FOR AN OUTPUT BUFFER

(71) Applicant: SEMICONDUCTOR COMPONENTS INDUSTRIES, LLC, Phoenix, AZ (US)

(72) Inventors: Athar Ali Khan. P, Bangalore (IN); Rajiv Pandey, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/681,442

(22) Filed: Nov. 12, 2019

(65) Prior Publication Data

US 2021/0021894 A1 Jan. 21, 2021

(30) Foreign Application Priority Data

Jul. 19, 2019 (IN) .............................. 201911029159

(51) Int. Cl.
*H04N 21/44* (2011.01)
*H04N 17/04* (2006.01)
*H04N 21/4363* (2011.01)

(52) U.S. Cl.
CPC ....... *H04N 21/44004* (2013.01); *H04N 17/04* (2013.01); *H04N 21/43635* (2013.01)

(58) Field of Classification Search
None
See application file for complete search history.

(56) References Cited

U.S. PATENT DOCUMENTS

| | | | | |
|---|---|---|---|---|
| 5,532,621 A * | 7/1996 | Kobayashi | .............. | G05F 1/465 326/58 |
| 6,066,971 A * | 5/2000 | Pappert | .................... | G05F 3/242 327/108 |
| 6,384,632 B2 * | 5/2002 | Tsuji | .............. | H03K 19/018592 326/58 |
| 6,674,304 B1 * | 1/2004 | Matthews | ............ | H03K 17/167 326/63 |
| 8,098,090 B2 * | 1/2012 | Le | ...................... | H03K 19/0185 327/534 |
| 8,188,615 B2 | 5/2012 | Du | | |
| 8,222,918 B1 | 7/2012 | Tan | | |
| 8,378,714 B2 | 2/2013 | Liang | | |
| 9,432,298 B1 * | 8/2016 | Smith | ................. | H04L 49/9057 |
| 2001/0015656 A1 * | 8/2001 | Tsuji | .............. | H03K 19/018592 326/57 |
| 2007/0103204 A1 * | 5/2007 | Egan | ..................... | G09G 5/006 327/100 |
| 2009/0121751 A1 * | 5/2009 | Bach | .............. | H03K 19/018528 327/108 |

(Continued)

*Primary Examiner* — Chikaodili E Anyikire
(74) *Attorney, Agent, or Firm* — The Noblitt Group, PLLC; Hettie L. Haines

(57) ABSTRACT

Various embodiments of the present technology may provide methods and apparatus for an output buffer. The output buffer is configured to perform in both a DP mode and an HDMI mode, as well as meet certain compliance conditions in an HDMI compliance testing mode. The output buffer includes a plurality of transistors and resistors arranged to operate in DP mode and HDMI mode. The plurality of transistors and resistors are arranged to reduce leakage current during the HDMI compliance testing mode.

20 Claims, 7 Drawing Sheets

(56) References Cited

U.S. PATENT DOCUMENTS

2010/0127762 A1* 5/2010 Le .................... H03K 19/0185
                                                              327/537
2018/0012886 A1* 1/2018 Mozak ................ H01L 27/0281
2018/0175832 A1* 6/2018 Sutanthavibul .... H03K 17/6871

* cited by examiner

METHODS AND APPARATUS FOR AN OUTPUT BUFFER

CROSS-REFERENCE TO RELATED APPLICATION

This application is based on and claims the benefit of Indian Provisional Application No. 201911029159, filed on Jul. 19, 2019, the contents of which are incorporated by reference.

BACKGROUND OF THE TECHNOLOGY

Many electrical systems utilize an interface to transmit data between a host device and a sink device. In many cases, the interface may be configured for multi-protocol applications, such as Display Port (DP), USB, and/or HDMI (high-definition multimedia interface). In the case of AC coupled applications (e.g., DP, USB), linearity (the degree to which the output follows the input) of the interface is a performance indicator. In the case of DC coupled applications (e.g., HDMI), the amount of leakage current when the host is OFF and the sink is ON may be used to determine if the interface meets certain compliance specifications (e.g., "$V_{OFF}$ compliance test" where leakage current must be less than 200 uA). Convention interfaces may use external and/or internal diodes to meet the $V_{OFF}$ compliance test, however, the use of diodes increases the cost and reduces linearity performance of the interface in DP mode. Accordingly, conventional multi-protocol interfaces are not able to maintain linearity across a wide range of outputs and meet the $V_{OFF}$ compliance test.

SUMMARY OF THE INVENTION

Various embodiments of the present technology may provide methods and apparatus for an output buffer. The output buffer is configured to perform in both a DP mode and an HDMI mode, as well as meet certain compliance conditions in an HDMI compliance testing mode. The output buffer includes a plurality of transistors and resistors arranged to operate in DP mode and HDMI mode. The plurality of transistors and resistors are arranged to reduce leakage current during the HDMI compliance testing mode.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

Figure 1:
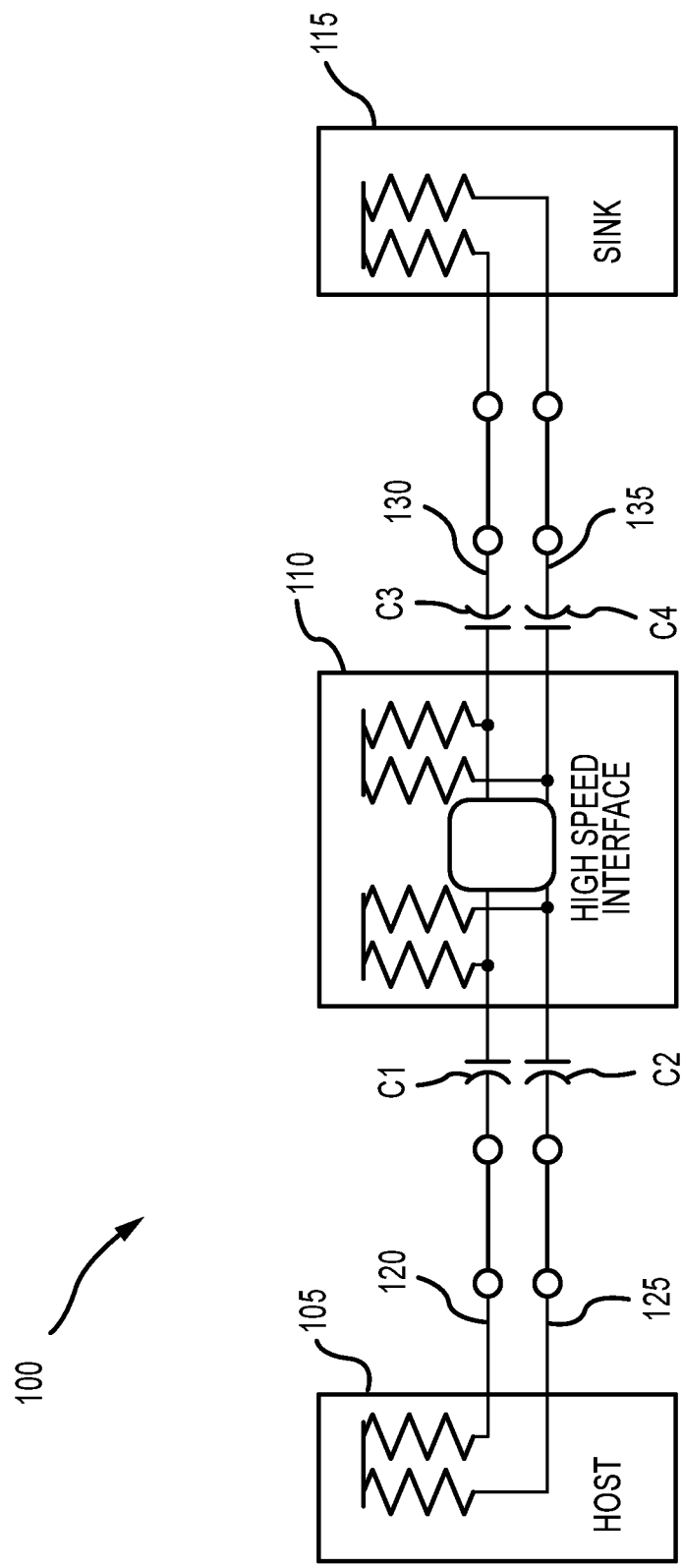
FIG. 1 is a block diagram of a system in accordance with an exemplary embodiment of the present technology.

The present technology may be described in terms of functional block components and various processing steps. Such functional blocks may be realized by any number of components configured to perform the specified functions and achieve the various results. For example, the present technology may employ various transistors, resistive elements, capacitors, and the like, which may carry out a variety of functions. In addition, the present technology may be practiced in conjunction with any number of electronic systems, such as automotive, aviation, "smart devices," portables, and consumer electronics, and the systems described are merely exemplary applications for the technology.

Methods and apparatus for an output buffer according to various aspects of the present technology may operate in conjunction with any suitable communication system. For example, and referring to FIG. 1, an exemplary system 100 may comprise a host device 105 (i.e., a source device), an interface circuit 110, and a sink device 115 (e.g., a computer monitor or display screen). In various applications, the system 100 may be powered by a battery (not shown).

According to an exemplary embodiment, the host device 105 and interface circuit 110 may be connected by a transmission line, such as a first transmission line 120 and a second transmission line 125, and a coupling capacitor, such as coupling capacitors C1, C2. Furthermore, the interface circuit 110 and the sink device 115 may be connected by a transmission line, such as a third transmission line 130 and a fourth transmission line 135, and a coupling capacitor, such as coupling capacitors C3, C4. Accordingly, the host device 105 and the sink device 115 are connected to each other via the interface circuit 110. The transmission lines 120, 125, 130, 135 may comprise any suitable communication lines, buses, links, wires, cables, and the like for transferring data.

The interface circuit 110 may provide high-speed communication (data transmission) at a various voltages, such as at high and low voltages, across a channel. In one embodiment, the interface circuit 110 may be configured to perform at 1.8 volts and 3.3 volts for data rates of 5 Gbps (gigabits per second), 8.1 Gbps, and 10 Gbps. In other embodiments, the interface circuit 110 may be configured to perform at any desired supply voltage level and any data rate. In addition, the interface circuit 110 may be capable of operating according to USB 3.1 SuperSpeed Plus protocol, for example completing related transmission and reception compliance testing at 10 Gbps. According to an exemplary embodiment, the interface circuit 110 may be implemented as a linear redriver for multi-protocol applications, such as USB, HDMI (high-definition multimedia interface), and/or DisplayPort.

In various embodiments, the interface circuit 110 may be configured as a uni-directional channel or a bi-directional channel. For example, the interface circuit 110 may transmit data in one direction (e.g., from the host device 105 to the sink device 115) or may transmit data in both directions (e.g., from the host device 105 to the sink device 115 and from the sink device 115 to the host device 105). The interface circuit 110 may have any desired architecture, such as a differential architecture or a single-ended architecture.

Figure 2:
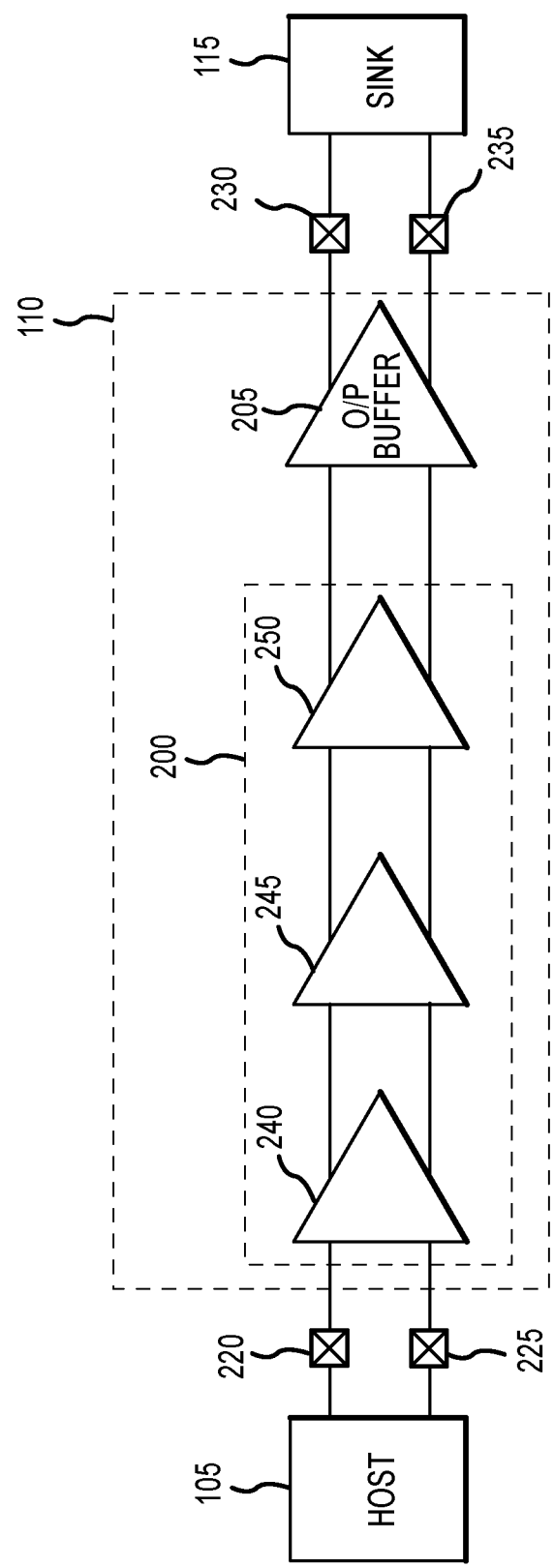
FIG. 2 is a block diagram of an interface in accordance with an exemplary embodiment of the present technology.

In an exemplary embodiment, and referring to FIGS. 1 and 2, the interface circuit 110 may comprise a pair of input pads, such as a first input pad 220 and a second input pad 225. In addition, an output terminal of the interface circuit 110 may comprise a pair of output pads, such as such as a third output pad 230 and a fourth output pad 235. The pair of input pads may be used to connect the host device 105 to the interface circuit 110, and the pair of output pads may be used to connect the interface circuit 110 to the sink device 115. For example, the pair of input pads 220, 225 may be connected to the first and second transmission lines 120, 125, respectively, and the pair of output pads 230, 235 may be connected to the third and fourth transmission lines 130, 135, respectively.

The interface circuit 110 may be configured to regenerate signals to boost the quality of input signals transmitted from the host device 105 to the sink device 115. The interface circuit 110 may also be configured to adjust and correct for known channel losses and restore signal integrity. For example, the interface circuit 110 may comprise a receiver 200 connected to an output buffer 205.

The receiver 200 may be configured to amplify, compensate for channel loss, and/or apply a desired gain to an input signal, such as an input signal from the host device 105. According to an exemplary embodiment, input terminals of the receiver 200 may be connected to the pair of input pads 220, 225 and the output terminals of the receiver 200 may be connected to the pair of output pads 230, 235 via the output buffer 205.

The receiver 200 may comprise any circuit and/or system suitable for providing a desired signal transmission and/or operating specifications. For example, the receiver 200 may comprise any number of circuits and/or devices that operate in conjunction with each other to adjust the gain of the input signal, equalize the input signal, and drive the input signal.

According to an exemplary embodiment, the receiver 200 may be configured to perform gain functions and equalize the input signal. For example, the receiver 200 may comprise a gain circuit 240, an equalizer circuit 245, and a pre-driver circuit 250 connected in series with each other. In one embodiment, the equalizer circuit 245 may follow the gain circuit 240, and the pre-driver circuit 250 may be follow the equalizer circuit 245. Accordingly, the gain circuit 240 may be directly connected to the pair of input pads 220, 225 and the pre-driver circuit 250 may be directly connected to the output buffer 205.

In one embodiment, the gain circuit 240 may comprise an amplifier with an adjustable gain, the equalizer circuit 245 may comprise a continuous time linear equalizer, and the pre-driver circuit 250 may comprise a second equalizer.

The output buffer 205 may be configured to provide a final power amplification stage to drive the load (e.g., the sink device 115). According to an exemplary embodiment, an input terminal of the output buffer 205 may be directly connected to an output terminal of the receiver 200. In addition, an output terminal of the output buffer 205 may be directly connected to the pair of output pads 230, 235.

Figure 3:
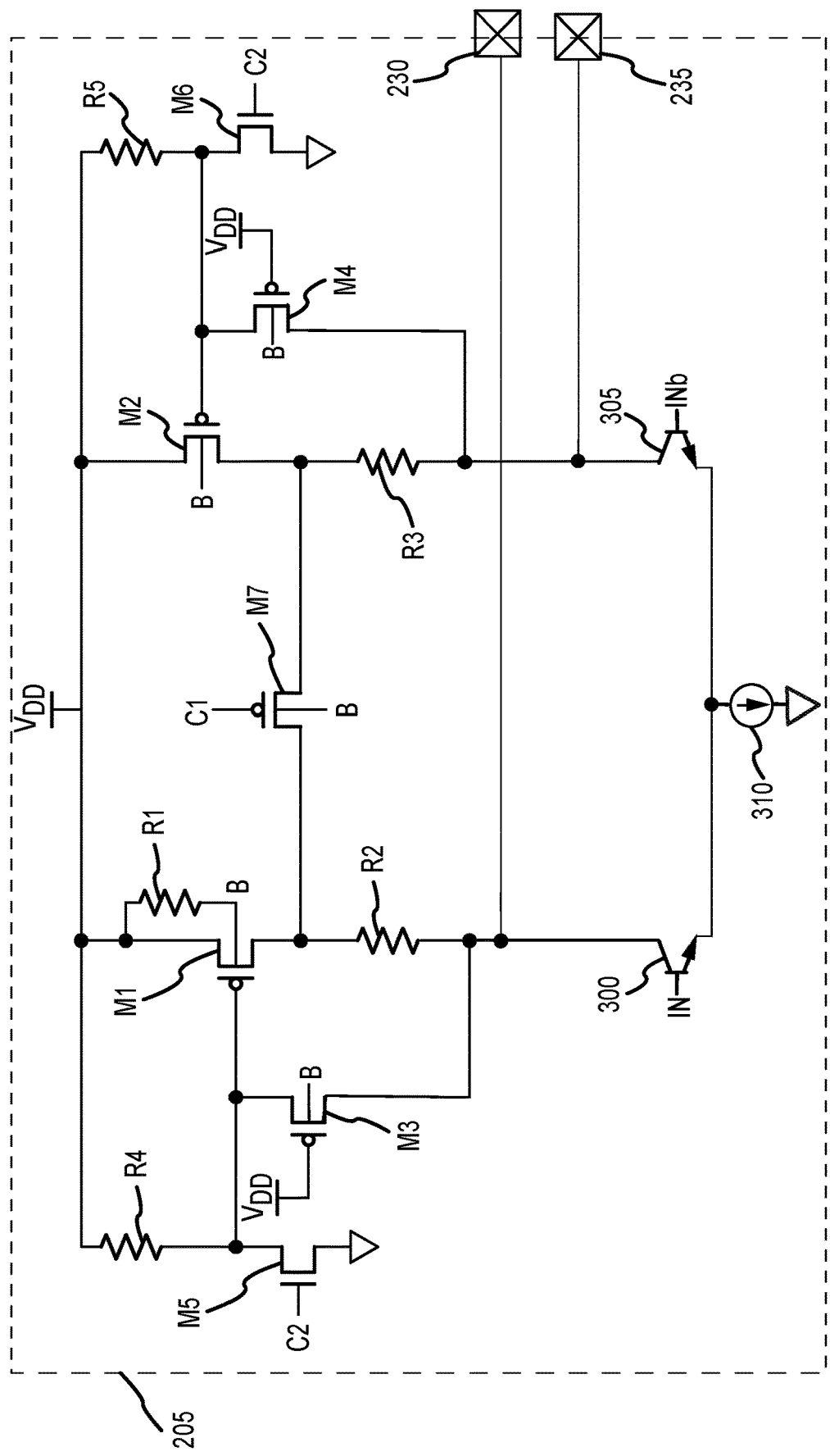
FIG. 3 is a circuit diagram of a differential output buffer in accordance with an embodiment of the present technology.

According to one embodiment, and referring to FIG. 3, the output buffer 205 may be configured to perform in a Display Port (DP) mode and a High-definition Multimedia Interface (HDMI) mode, as well as meet certain compliance conditions in an HDMI compliance testing mode. According to an exemplary embodiment, the output buffer 205 may have a differential architecture.

The output buffer 205 may comprise a plurality of transistors and resistors arranged to operate in DP mode and HDMI mode, as well as to reduce leakage current during the HDMI compliance testing mode. For example, the output buffer 205 may comprise a first transistor M1, a second transistor M2, a third transistor M3, a fourth transistor M4, a fifth transistor M5, a sixth transistor M6, and a seventh transistor M7. The output buffer 205 may further comprise a first resistor R1, a second resistor R2, a third resistor R3, and a fourth resistor R4. The second and third resistors R2, R3 may be referred to as a termination resistor.

The first transistor M1 may comprise a p-channel transistor comprising a source terminal, a gate terminal, a drain terminal, and a bulk terminal. The source terminal of the first transistor M1 may be connected to a supply voltage $V_{DD}$ (e.g., 3.3 V), and the drain terminal may be connected to the first output pad 230, via the second resistor R2. The bulk terminal may be connected to a bulk potential B. In an exemplary embodiment, the first resistor R1 may be connected to the bulk potential B and the source terminal of the first transistor M1.

Similarly, the second transistor M2 may mirror the first transistor in both type and arrangement, with the third resistor R3 connected between the second output pad 235 and a terminal of the second transistor M2.

The seventh transistor M7 may comprise a p-channel transistor comprising a source terminal, a gate terminal, a drain terminal, and a bulk terminal. The seventh transistor M7 may be connected between the first and second transistors M1, M2, wherein the source and drain terminals of the seventh transistor M7 are connected to the drain terminals of the first and second transistors M1, M2. The gate terminal of the seventh transistor M7 may be configured to receive a first control signal C1, wherein the first control signal C1 may be used to turn ON/OFF the seventh transistor M7 based on the desired operating mode. The bulk terminal of the seventh transistor M7 may be connected to the bulk potential B along with the first and second transistors M1, M2.

The third transistor M3 may comprise a p-channel transistor comprising a source terminal, a gate terminal, a drain terminal, and a bulk terminal. The source terminal of the third transistor M3 may be connected to the gate terminal of the first transistor M1, the drain terminal may be connected to the first output pad 230, the gate terminal may be connected to the supply voltage $V_{DD}$, and the bulk terminal may be connected to the bulk potential B.

Similarly, the fourth transistor M4 may mirror the third transistor M3 in both type and arrangement with respect to the second transistor M2.

According to various embodiments, the third and fourth transistors M3, M4 may be implemented using a bipolar junction transistor (BJT), a metal-oxide-silicon (MOS) transistor, or a series combination of a passive component with an active transistor.

The fifth transistor M5 may comprise an n-channel transistor comprising a source terminal, a gate terminal, a drain terminal. The drain terminal of the fifth transistor M5 may be connected to the gate terminal of the first transistor M1, the source terminal of the third transistor. The drain terminal may also be connected to the supply voltage $V_{DD}$ via the fourth resistor R4. In other words, the first transistor M1, the third transistor M3, the fifth transistor M5, and the fourth resistor R4 may be connected to each other at a common node. The gate terminal of the fifth transistor M5 may be configured to receive a second control signal C2, wherein the second control signal C2 may be used to turn ON/OFF the fifth transistor M5 based on the desired operating mode.

Similarly, the sixth transistor M6 may mirror the fifth transistor M5 in both type and arrangement with respect to the second and fourth transistors M2, M4. In addition, the sixth transistor M6 may be controlled according to the second control signal C2.

According to various embodiments, resistors R1, R4 and R5 may be implemented with a resistor in series with an active transistor (e.g., BJT, MOS, or a combination).

The output buffer 205 may further comprise a first input transistor 300 to receive a first input signal IN from the receiver 200, and a second input transistor 305 to receive a second input signal INb from the receiver 200. The first input transistor may be connected to the second resistor R2 at a first terminal and the second input transistor 305 may be connected to the third resistor R3 at a first terminal. Both the first and second input transistors 300, 305 may be further connected to a current source 310 via respective second terminals. The first and second input transistors 300, 305 may comprise bipolar junction transistors or any other suitable transistor type.

Figure 4:
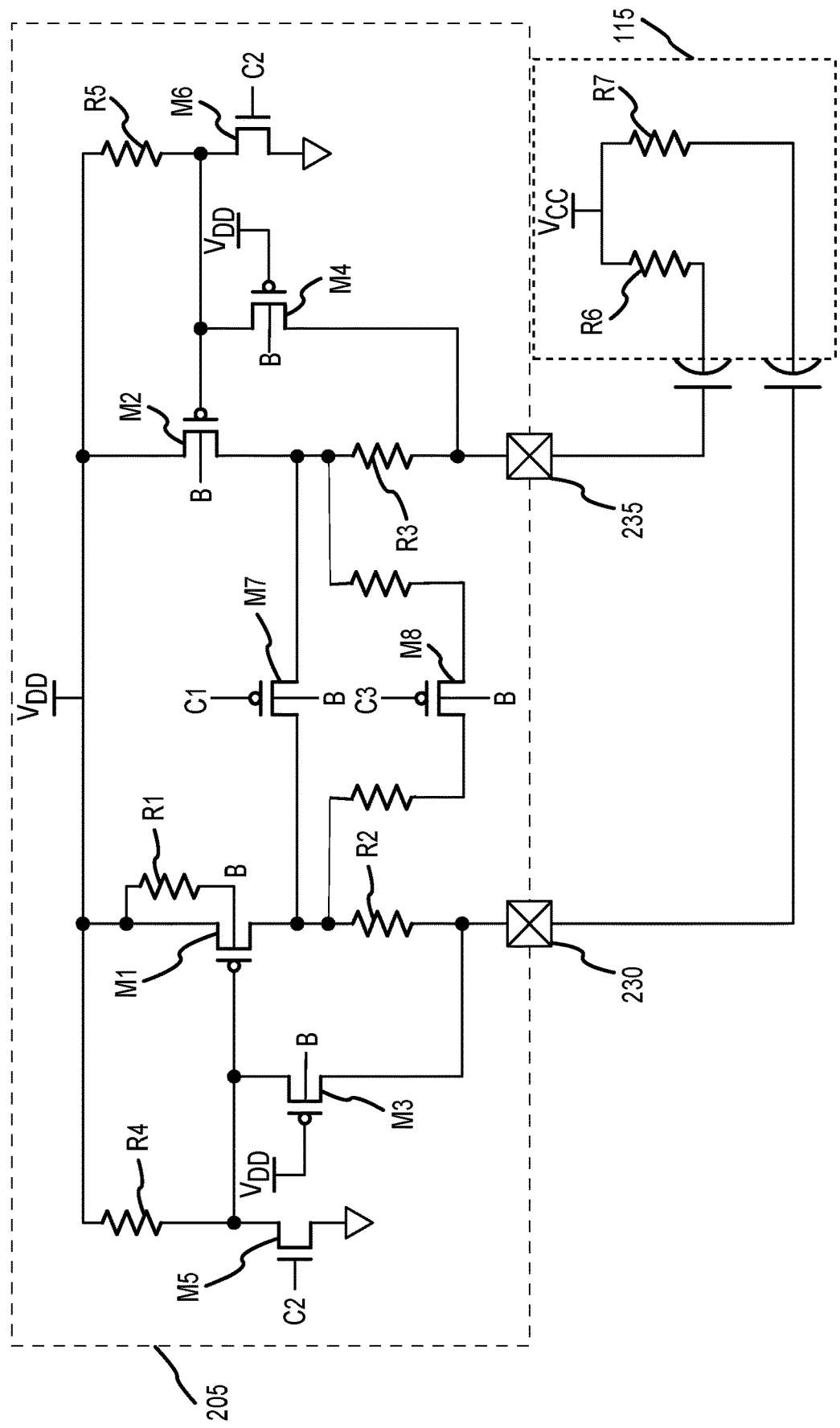
FIG. 4 is an alternative, simplified circuit diagram of the differential output buffer in accordance with the present technology.
Figure 5:
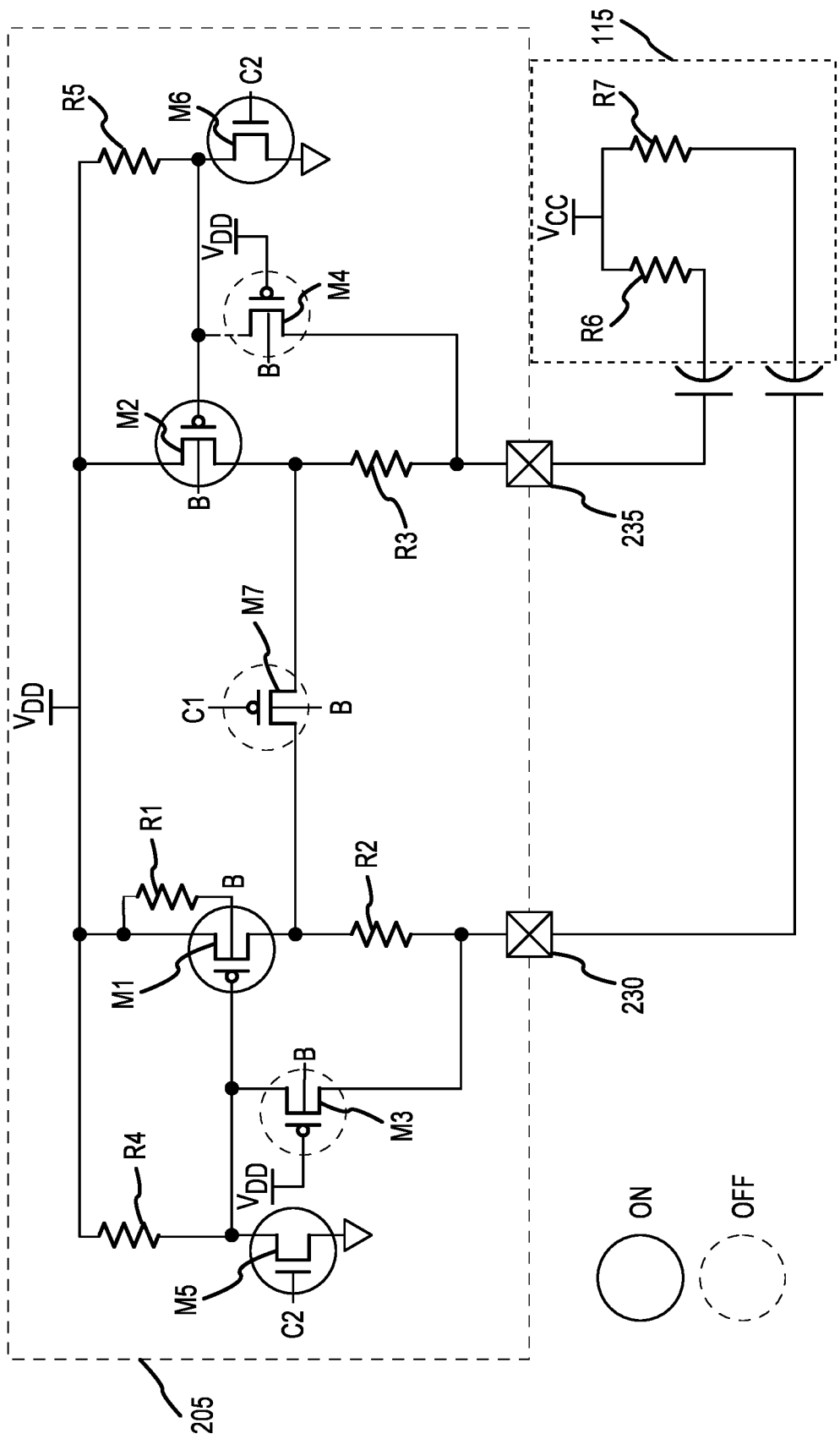
FIG. 5 is a simplified circuit diagram of the differential output buffer in Display Port mode in accordance with an embodiment of the present technology.
Figure 6:
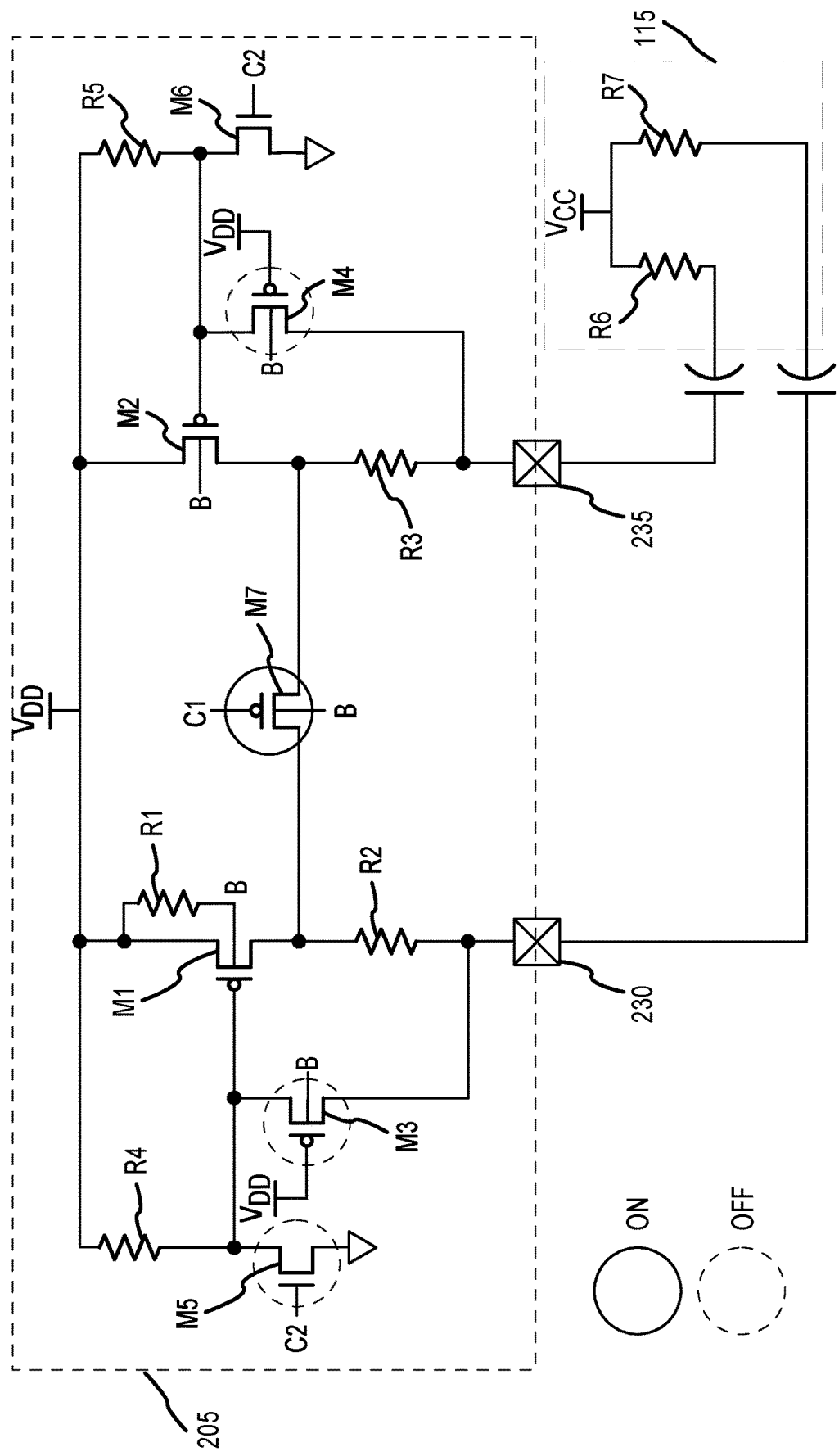
FIG. 6 is a simplified circuit diagram of the differential output buffer in HDMI mode in accordance with an embodiment of the present technology.
Figure 7:
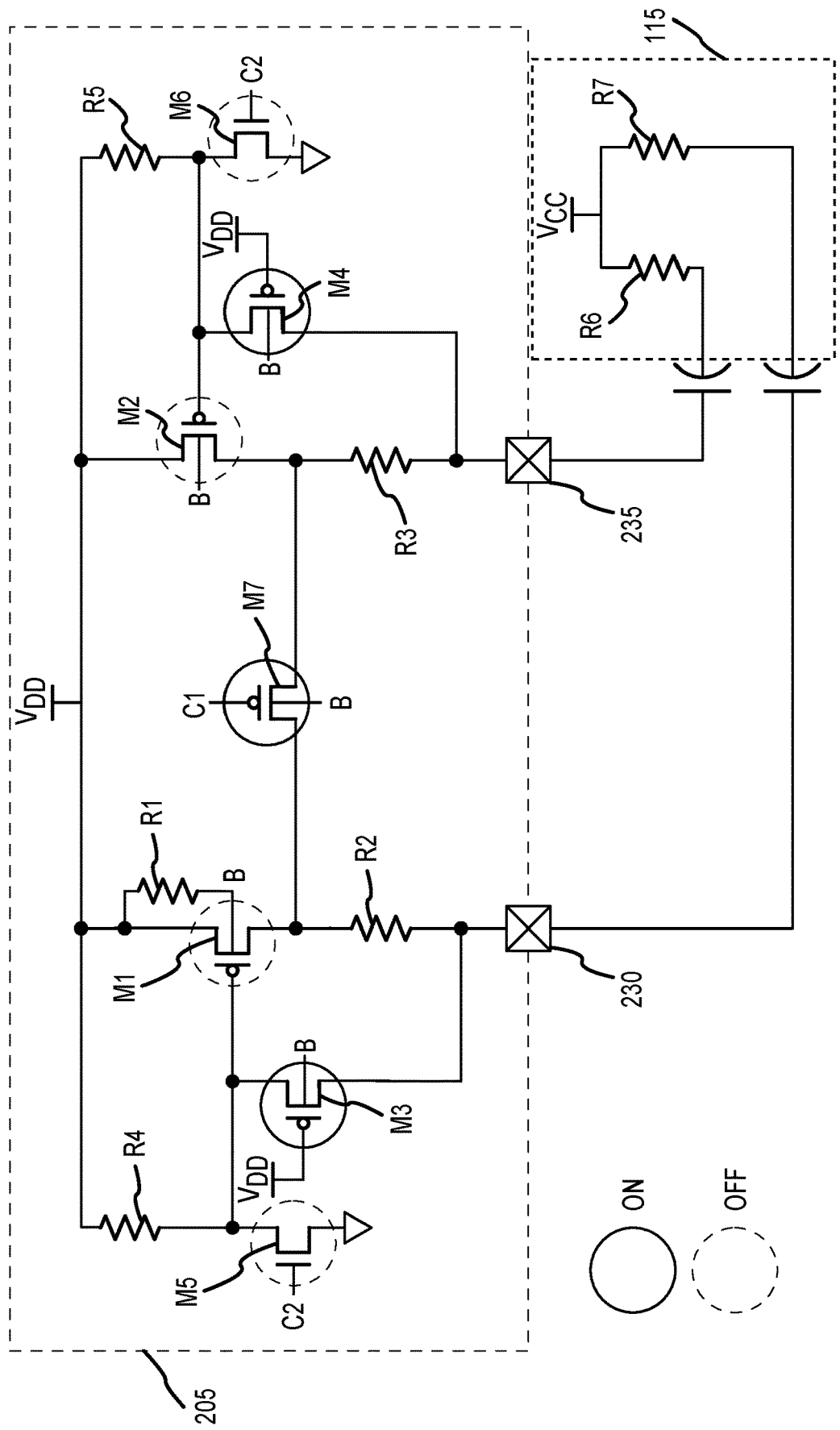
FIG. 7 is a simplified circuit diagram of the differential output buffer during a testing mode for HDMI compliance in accordance with an embodiment of the present technology.

According to another embodiment, and referring to FIG. 4, the output buffer 205 may be configured to provide programmability by changing the resistance at the output pads 230, 235. For example, the output buffer 205 may further comprise one or more transistors, such as an eighth transistor M8, connected in parallel with the seventh transistor M7. The eighth transistor M8 may be of the same type and arrangement as the seventh transistor M7. For example, the eighth transistor M8 may comprise a p-channel transistor and may be connected to the first and second transistors M1, M2 and to the bulk potential. The eight transistor M8 may be controlled according to a third control signal C4, wherein the third control signal C3 may be used to turn ON/OFF the eight transistor M8 based on the resistance at the output pads 230, 235. Resistors may be connected in series with the eighth transistor M8 to provide a different resistance than that of the seventh resistor M7.

In operation, and referring to FIGS. 1 and 5-7, the output buffer 205 may operate in one of three modes: the DP mode, the HDMI mode, and the HDMI compliance testing mode, according to the first and second control signals C1, C2.

During the DP mode, the interface circuit 110 may be AC coupled with the host device 105 and the sink device 115 to transmit audio and/or video data from the host device 105 to the sink device 115. The system 100 may selectively activate the output buffer 205 to perform in the DP mode. For example, the system 100 may assert the second control signal C2 to turn ON the fifth and sixth transistors M5, M6, which turns ON the first and second transistors M1, M2. The first control signal C1 is de-asserted to turn OFF the seventh transistor M7. The third and fourth transistors M3, M4 are also OFF during the DP mode since their respective gates are connected to the supply voltage $V_{DD}$.

During the HDMI mode, the interface circuit 110 may be DC coupled with the host device 105 and the sink device 115 to transmit audio and/or video data from the host device 105 to the sink device 115. During the HDMI mode, the host device 105 may be OFF, while the sink device 115 may be ON. In order to preserve the battery life, it may be desired to prevent or otherwise reduce leakage current in the output buffer 205 during the HDMI mode.

The system 100 may selectively activate the output buffer 205 to perform in the HDMI mode. For example, the system 100 may assert the first control signal C1 to turn ON the seventh transistor M7 and de-assert the second control signal C2 to turn OFF the fifth and sixth transistors M5, M6. Accordingly, the first, second, third and fourth transistors M1, M2, M3, M4 are also OFF during the HDMI mode.

In other embodiments, the third control signal C3 may be asserted to turn ON the eight transistor M8 to vary the resistance at the output pads 230, 235.

During the HDMI compliance testing mode, the interface circuit 110 may be DC coupled with the host device 105 and the sink device 115, the supply voltage $V_{DD}$ may be set to any voltage in the range of zero volts to 3.3V (i.e., $V_{DD}$=0V to 3.3V), the first control signal C1 is asserted to turn ON the seventh transistor M7, and the second control signal C2 is de-asserted to turn OFF the fifth and sixth transistors M5, M6. Accordingly, the first and second transistors M1, M2 are also OFF. The supply voltage $V_{DD}$ may be set according to the system specifications, desired operating specifications, and the like.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An output buffer having an output pad, comprising:
a plurality of transistors, wherein each transistor comprises a source terminal, a drain terminal, a gate terminal, and a bulk terminal, comprising:
a first transistor connected in parallel with a second transistor; wherein the first and second transistors are connected to a supply voltage and a bulk potential; and
wherein a first resistor is connected to the bulk potential and the source terminal of the first transistor;
a third transistor connected between the first and second transistors; wherein the third transistor is also connected to the bulk potential and responsive to a first control signal; and
a fourth transistor connected:
in series with a second resistor; and
to the output pad;
wherein the second resistor is connected between the gate terminal of the first transistor and the supply voltage.

2. The output buffer according to claim 1, wherein the bulk terminal of the fourth transistor is connected to the bulk potential.

3. The output buffer according to claim 1, wherein each of the first, second, third, and fourth transistors comprise a p-channel transistor.

4. The output buffer according to claim 1, further comprising a fifth transistor, from the plurality of transistors, connected in series with the second resistor and responsive to a second control signal.

5. The output buffer according to claim 4, wherein the fifth transistor comprises an n-channel transistor.

6. The output buffer according to claim 1, further comprising a termination resistor connected directly between the output pad and the first transistor.

7. The output buffer according to claim 1, further comprising a sixth transistor connected in parallel with the third transistor and connected to the bulk potential.

8. A method for operating a multi-modal output buffer connected between a host device and a sink device, comprising:
operating the output buffer in a first mode comprising:
turning ON a first plurality of transistors, wherein the first plurality of transistors comprises:
a first p-channel transistor connected to a supply voltage, a bulk potential, and to an output pad via a termination resistor; and
a first n-channel transistor connected to a gate terminal of the first p-channel transistor; and
turning OFF a second plurality of transistors, wherein the second plurality of transistors comprises:
a second p-channel transistor connected between the gate terminal of the first p-channel transistor and the output pad; and
a third p-channel transistor connected to a drain terminal of the first p-channel transistor and the bulk potential;
operating the output buffer in a second mode comprising:
turning ON the third p-channel transistor; and
turning OFF the first p-channel transistor, the first n-channel transistor, and the second p-channel transistor; and
operating the output buffer in a test mode comprising:
turning ON the third p-channel transistor and second p-channel transistor; and
turning OFF the first p-channel transistor and the first n-channel transistor.

9. The method according to claim 8, further comprising measuring a voltage at the output pad during the test mode.

10. The method according to claim 8, wherein operating the output buffer in the test mode further comprises turning OFF the host device while the sink device is ON.

11. The method according to claim 8, further comprising preventing leakage across the output pad during the test mode by providing a first resistor in series with the second p-channel transistor.

12. The method according to claim 8, further comprising preventing leakage current across the output pad during the test mode by providing a second resistor connected to the bulk potential and a source terminal of the first p-channel transistor.

13. The method according to claim 8, wherein the first mode is a Display Port mode and the second mode is a High-definition Multimedia Interface mode.

14. A system, comprising:
a host device connected to a sink device via an interface, wherein the interface is configured to operate in a first mode and a second mode, and comprises:
a receiver connected in series with an output buffer, wherein the output buffer is connected to the sink device via an output pad and comprises:
a plurality of transistors, wherein each transistor comprises a gate terminal, a drain terminal, a source terminal, and a bulk terminal; and wherein at least a first p-channel transistor and a second p-channel transistor, from the plurality of transistors, are connected to a common bulk potential via the respective bulk terminals;
a first resistor connected to the bulk terminal of the first p-channel transistor and the source terminal of the first p-channel transistor;
a third p-channel transistor, from the plurality of transistors, connected to the output pad and the gate terminal of the first p-channel transistor;
a second resistor connected to:
the source terminal of the third p-channel transistor; and
the gate terminal of the first p-channel transistor.

15. The system according to claim 14, wherein the first and second p-channel transistors are connected to a supply voltage via the respective source terminals.

16. The system according to claim 14, wherein the gate terminal of the second p-channel transistor is configured to receive a first control signal.

17. The system according to claim 14, further comprising a first n-channel transistor, the plurality of transistors, configured to operate according to a second control signal and connected in series with the second resistor.

18. The system according to claim 14, further comprising a termination resistor connected directly between the output pad and the first p-channel transistor.

19. The system according to claim 14, wherein the bulk terminal of the third p-channel transistor is connected to the bulk potential.

20. The system according to claim 14, further comprising a fourth p-channel transistor connected in series with a resistor and connected in parallel with the second p-channel transistor and connected to the common bulk potential.

* * * * *